F. MYERS.
TOWEL RACK.
No. 109,648.   Patented Nov. 29, 1870.
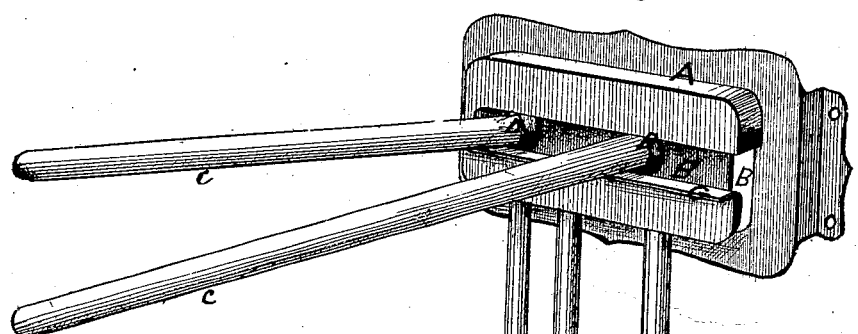
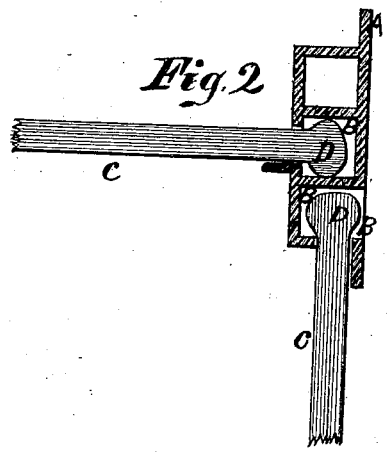
WITNESSES:   INVENTOR:

United States Patent Office.

FREDERICK MYERS, OF NEW YORK, N. Y.

Letters Patent No. 109,648, dated November 29, 1870.

IMPROVEMENT IN TOWEL-RACKS.

The Schedule referred to in these Letters Patent and making part of the same.

*To all whom it may concern:*

Be it known that I, FREDERICK MYERS, of the city of New York, in the county and State of New York, have invented new and useful Improvements in Towel-Racks; and I do hereby declare that the following is a full, clear, and exact description of the same, reference being had to the accompanying drawing, and to the letters of reference marked thereon, wherein—

Figure 1 represents a perspective view of my improved towel-rack.

Figure 2 represents a cross-section of the same.

My invention is designed to provide a plate, constructed with grooves or recesses, and racks, having a ball on their ends to fit within the said grooves to hold them in their proper places, the racks being for the purpose of holding towels, &c.

My invention consists in the combination of a plate provided with suitable grooves or recesses, and racks having a ball on their ends, the said ball to work within the grooves, the ball acting as a joint for the rack, allowing it to be moved in any desired direction, and holding the rack in its proper position within the grooves. It also consists in certain details of arrangements, which will be hereafter described.

A represents a plate, which may be of any preferred construction and metal.

B B B represent the recesses or grooves, constructed of any suitable size.

C C C C represent the racks, having on their ends a ball, D.

G represents a lip or projection, to support the rack to prevent it from breaking.

The plate A is constructed so as to be fastened against the wall, or any desired location.

The ball D on the end of each rack is made of such a size so as to fit and work freely within grooves B B B. The ball D, when placed within the grooves B, forms a joint for the rack, and holds it in its proper position.

When the racks are not in use, they may be placed in the lower grooves until they are required for use.

The said racks may be constructed of any suitable materials, provided with a ball on each end, so that, if one end should break, it may be reversed and used on the other end.

It is found best to construct the racks of wood, the ball and rack being made of one solid piece. The ball may, if desired, be constructed of metal, the ball having a screw or tube attached, or any suitable device to fasten it on the ends of the racks.

Having thus fully described my invention,

What I claim, and desire to secure by Letters Patent, is—

1. The combination of the plate A, the grooves B B B, the lip or projection G, the rack C, and the ball D, so applied as to form thereof a towel-rack, substantially as shown and described.

2. The towel-rack above described, constructed, arranged and operating as set forth.

FREDERICK MYERS.

Witnesses:
DANIEL F. MYERS,
F. A. LE HUNTTE.